C. F. VERLEGER
Running-Gear.

No. 8,711. Patented Feb. 3, 1852.

UNITED STATES PATENT OFFICE.

C. F. VERLEGER, OF BALTIMORE, MARYLAND.

RUNNING-GEAR OF CARRIAGES.

Specification of Letters Patent No. 8,711, dated February 3, 1852.

*To all whom it may concern:*

Be it known that I, CHARLES F. VERLEGER, of Baltimore, in the State of Maryland, have invented certain new and useful Improvements in the Running-Gear of Four-Wheeled Carriages; and I do hereby declare that the following is a full, clear, and exact description thereof, reference being had to the accompanying drawings and letters marked thereon, forming a part of this specification, in which—

Figure 1:
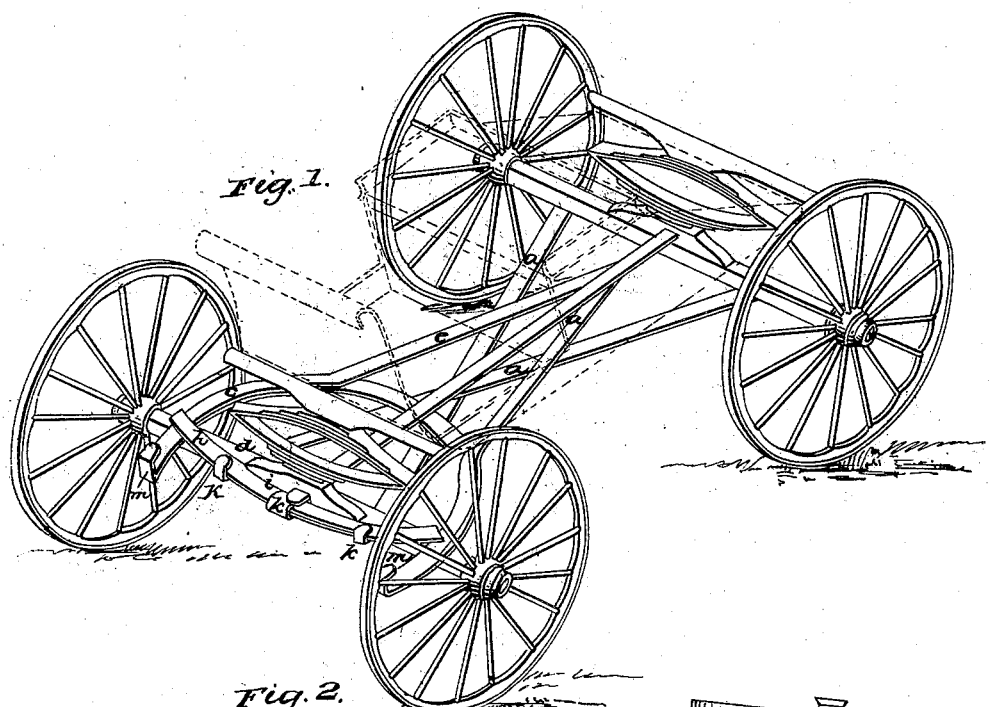
Figure 2:
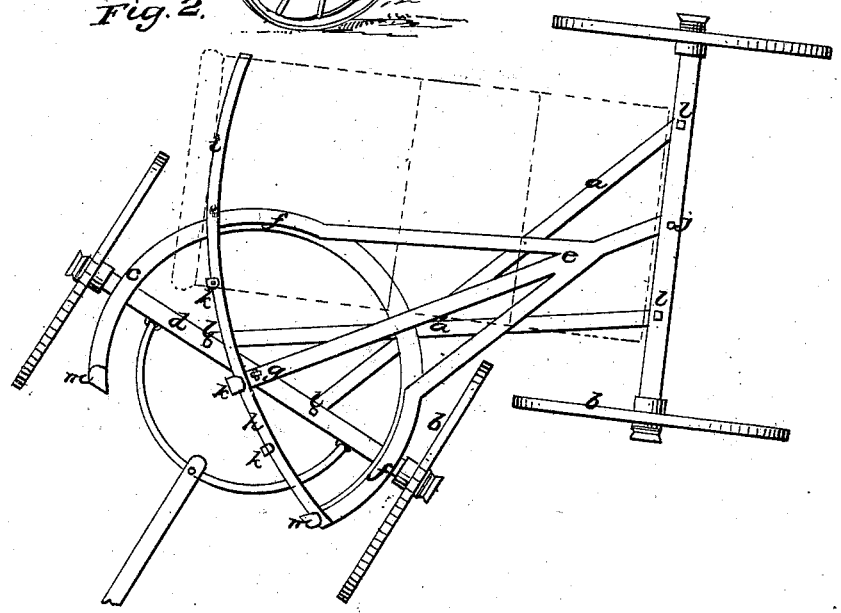

Figure 1 is an isometrical view of a four wheeled carriage with the body represented in red lines, and Fig. 2 a top view of the same showing the relative position of the fore and hind axle and wheels when turning around in the shortest possible space, with the position of the body represented in red lines.

In each of these figures where the same parts are shown they are designated by the same letters of reference.

The nature of my invention consists in an improved arrangement of the running gear of four wheeled carriages, whereby I am enabled to produce a light and strong carriage, all four wheels being of equal size, which can be turned around with ease and without danger of upsetting, in a space of about the diameter of one of the wheels.

The hind axle being connected with the fore axle by cross ties $a$, $a$ the motion of one is governed by the other, so that, when the carriage is turning in the shortest possible space, or the axles at their greatest angle, as represented in the drawing, the inner wheels $b$, $b$, assume a position nearly at right angles to each other, consequently the fore part of the body of the carriage is thrown off the support of the fore axle.

In order to give the desired support to the fore part of the body when in the act of turning short I arrange and adapt the running gear as follows: $e$, is a large segment plate which is firmly secured to the fore axle $d$; $e$, a perch jointed to the center of the hind-axle having segment plates $f$, $f$, adapted to them and which slide on the top of the segment $c$. This perch is also jointed to the fore axle by the perch pin $g$, which pin passes through a slot instead of a round hole in the perch, for the purpose of giving a little longitudinal play so as to prevent any strain upon the rods $a$, $a$, when the carriage is turning short. $h$, is a segment plate secured to the end of the perch $e$, on top of which slides a corresponding segment plate $i$, secured to the perch block. The segment plates $h$ and $i$ are of the same curve corresponding with a curve drawn from the center pin $j$ of the hind axle, and the segment plate $i$ is prevented from rising or getting out of place by the hooks or brackets $k$, $k$, $k$. The points on the axle $l$, $l$, $l$, $l$, for the connection of the rods $a$, $a$, with the axles, are ascertained by dividing the hind axle into four parts, and the fore axle into six parts. This gives the desired angle to the axles, that is to say, respectively to each other—giving the greatest ease and regularity of motion to the respective parts when the carriage is turning around in a small space, and avoiding all danger of upsetting. $m$, $m$, are stops at each end of the segment plate $c$, for the purpose of prescribing the extent of the angle of the axles, and preventing the wheels $b$, $b$, from touching each other.

Having thus fully described my improved running gear for four wheeled carriages and the advantages attained by the same over all others, when the object is to turn in as small a space as possible without running the fore wheels under the body of the carriage, what I claim as new therein, and desire to secure by Letters Patent is—

The combination of the segment plate $c$ and the perch $e$, sliding thereon and connected with the axles as described, with the segment plate $h$, forming a part of the perch $e$, and the plate $i$, attached to the perch block of the body and sliding on the plate $h$ in connection with the rods $a$, $a$, by which the other parts are regulated and governed in their action, constituting an arrangement of running gear constructed substantially as in the manner herein fully set forth and represented.

In testimony whereof I have hereunto signed my name before two subscribing witnesses.

C. F. VERLEGER.

Witnesses:
F. S. MYER,
GEO. R. WEST.